Patented Mar. 21, 1950

2,501,188

UNITED STATES PATENT OFFICE 2,501,188

2-(2'-METHYL-4'-AMINO-5'-METHOXY-PHENYL)-2,1,3 BENZOTRIAZOLE

Robert P. Parker, Somerville, and Joseph Seruto, Bound Brook, N. J., assignors to American Cyanamid Company, New York, N. Y., a corporation of Maine No Drawing. Application October 22, 1947, Serial No. 781,489

1 Claim. (Cl. 260—308)

This invention relates to a new series of benzotriazole derivatives. More particularly, the invention contemplates new 2-(4'-aminophenyl)-2,1,3 benzotriazoles particularly useful as dye bases in the production of new and valuable azoic dyes and pigments, and to methods for the production of these bases. The new dyestuffs, per se comprise the subject matter of our copending application for U. S. Letters Patent, Serial No. 781,490, filed of even date.

The compounds of the present invention may be represented by the following general formula:

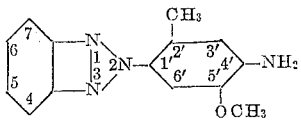

wherein the ring positions, for the purposes of the invention, may be considered to be numbered as indicated.

In the past, a number of aromatic amino compounds have been known, which upon diazotization and coupling yield the deeper shades in the maroon to violet range. However, for a number of reasons, both in their manufacture and in their use, these materials are not as satisfactory as could be desired.

Many of these amine bases require rigid conditions for diazotization. Difficulty is often encountered with regard to the stability of the diazo compounds formed. The coupling power of these known amine bases is often very low, which characteristic restricts the coupling conditions which can be employed. In addition, the known aromatic amines heretofore employed as bases in the production of these deeper shades of maroon to violet resulted in dyes and pigments often characterized by an insufficient light and wash fastness and alkali stability.

In spite of these serious disadvantages resident in the prior art bases and the dyes produced therefrom, they have enjoyed rather wide commercial use, since they represented the best obtainable products prior to the present invention. This is particularly true in regard to insoluble azoic dyes and pigments of the deeper shades of maroon to violet.

It is, therefore, the primary object of the present invention to provide a new series of bases characterized by their ease of diazotization and coupling to produce new azoic dyes and pigments having the deeper shades of maroon to violet, which bases and dyes are not subject to many of the foregoing difficulties and limitations of the prior art compounds.

According to the present invention the above objects are generally attained by the discovery and utilization as a new dye base, new 2-(2'-methyl, 5'-methoxy-4'-aminophenyl)-2,1,3 - benzotriazole. This compound is capable of being readily diazotized to stable diazo comounds, exhibiting very strong coupling activity, and when coupled, particularly with the customary ice color coupling components, produce a new series of insoluble azo dyestuffs of the desired deeper shades of maroon to violet having excellent brilliance, marked wash fastness and stability to strong alkalis and satisfactory light fastness. The strong coupling activity of this amine base permits the advantageous use of such wide pH range. One of the important advantages of this non-critical pH factor is that it permits production of pigments and dyes in a wide range of physical forms exhibiting good working properties for a large variety of uses while maintaining excellent covering power and clean tone.

The base of the present invention when coupled to arylides of hydroxynaphthoic acids, forms insoluble azo dyestuffs. For the purposes of the present invention, these coupling components are definitely to be preferred because, in addition to the superior properties above mentioned, the resultant colored products are characterized by the very desirable deeper shades of maroon to violet.

The azoic dyes and pigments derived from this new amine base may be produced in substance by coupling in the presence or absence of a substrate, such as organic and inorganic extenders to produce pigments in bulk. They may equally well be produced on the fibre of textile materials by well known dyeing and printing procedures. For example, a cellulosic material is grounded in an alkaline prepared bath with an ice-color coupling component, and then turned in a developing bath containing the diazotized base to full color development, or the cellulosic fiber impregnated by an alkaline solution of the coupling component may be printed with a buffered and thickened paste of a diazotized base.

The compounds of the present invention may be prepared by the known procedure of diazotizing and coupling an ortho-nitraniline with a properly substituted aniline, the resultant ortho-nitro azo compound being then reduced under such conditions as to lead to the formation of the triazole ring. For example, alkaline zinc reduction may be employed.

Specifically, the base of the present invention is prepared by diazotizing an ortho nitraniline and coupling with the desired properly substituted aniline in acid media such as dilute aqueous hydrochloric acid or an alcoholic hydrochloric acid solution. The resultant nitro phenylazo compound is dissolved in an organic solvent such as alcohol or a mixture thereof with sodium acetate. To this solution is added an aqueous caustic alkali solution containing zinc dust, or the zinc dust may be added first with subsequent addition of the aqueous caustic solution. The mixture is heated at reflux temperature until reaction is complete and the zinc sludge is removed by filtration. The hot filtrate, combined with hot alcoholic washings of the residue, is chilled to precipitate the resulting 2-(4'-aminophenyl)-2,1,3 benzotriazole. The products may be dissolved in a suitable acid and recrystallized by addition of ammonia or may be recrystallized from alcohol.

The arylide group in the coupling component may be a simple aromatic group such as the radical of aniline or of an aniline derivative or of a naphthylamine, or it may be the radical of a heterocyclic amine, such as, e. g., an amine of the benzothiazole series, or of a diamine of the diphenylene oxide or diphenylene sulfone series.

The invention will be more fully illustrated in conjunction with the following examples which are meant to be illustrative only and not by way of limitation. All parts are by weight unless otherwise noted.

*Example 1*

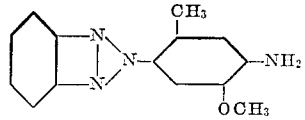

28.6 parts of 2-methoxy-4-(2'-nitrophenylazo)-5-methyl aniline and 24 parts of sodium acetate trihydrate are stirred in a mixture of 138 parts of alcohol and 10 parts of water. The temperature is adjusted at 72° C. and 12 parts of zinc dust are added. After ten minutes 12 parts additional zinc dust are added and the temperature is held at 78° C. for ¼ hour. The reaction mixture is cooled to 70° C. and 21 parts of glacial acetic acid are slowly added. When addition is complete the whole is chilled to 5° C. and is filtered. The residue is heated at the boil under 120 parts of alcohol, filtered hot, treated with 90 parts of water, chilled well and the crystallate filtered off. After washing the residue well with water, it is dried. The pure 2-(2'-methyl-4'-amino-5'-methoxyphenyl)-2,1,3-benzotriazole melts at 131-132° C.

2-methoxy-4-(2'-nitrophenylazo)-5-methyl aniline used in this preparation is obtained by coupling diazotized o-nitraniline with cresidine in dilute hydrochloric acid solution. The pure dye melts at 136-137° C.

*Example 2*

5.1 parts of 2-(2'-methyl-4'-amino-5'-methoxyphenyl)-2,1,3-benzotriazole are stirred in 30 parts of water until well wetted. 17.5 parts of 17% hydrochloric acid are added and at 25° C. diazotization is completed by addition of 1.4 parts of sodium nitrite dissolved in 20 parts of water. The solution is clarified, treated with 32 parts of salt at low temperature, the cream colored precipitate of diazonium chloride is filtered off and washed with cold 25% brine. The filter cake is ground with 12 parts of a mixture of anhydrous sodium sulfate and magnesium sulfate dihydrate (ratio of 1:2) to yield a dry powder, readily soluble in water.

When this blended diazonium chloride is applied by printing from a roll on cotton cloth previously grounded in the usual manner in an alkaline solution with the anilide of 2-hydroxy-3-naphthoic acid and the resulting print dried, cleared at 60° C. in a 2% soda ash bath, and soaped at 65° C. in a ½ soap solution, a strong Bordeaux pattern is received.

*Example 3*

Three cotton skeins, each of 5 parts by weight, are wet out at elevated temperature in ½% soap solution, and rinsed. They are separately grounded for ¼ hour in alkaline prepare baths of the following composition.

1.0 parts naphthol
    5.0 parts methanol
    5.0 parts 30 Bé. caustic
    300.0 parts water After wringing out, the skeins are developed to full color in baths containing 0.5 part of the blended diazonium chloride obtained in Example 2, 1 part of 50% acetic acid and 300 parts of water. The dyed skeins are cleared in 2% soda ash at 60° C. and finished in ½% soap solution at 60° C.

The colors with the naphthols used are summarized:

| | Naphthol | Color |
|---|---|---|
| 1 | 2-hydroxy-3-naphthoic acid-(2'-ethoxyanilide) | Deep claret. |
| 2 | 2-hydroxy-3-naphthoic acid-(2'-methyl anilide) | Maroon. |
| 3 | 2-hydroxy-3-naphthoic acid-(2'-methyl-4'-methoxy anilide). | Do. |

What we claim is:

The aminobenzotriazole represented by the following formula:

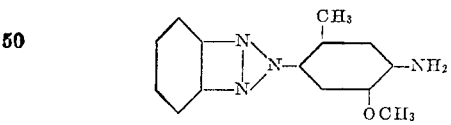

ROBERT P. PARKER.
JOSEPH SERUTO.

REFERENCES CITED

The following references are of record in the file of this patent:

UNITED STATES PATENTS

| Number | Name | Date |
|---|---|---|
| Re. 17,306 | Laska et al. | May 28, 1929 |

FOREIGN PATENTS

| Number | Country | Date |
|---|---|---|
| 754,028 | France | Oct. 30, 1933 |